United States Patent [19]

Kunz

[11] 4,400,593

[45] Aug. 23, 1983

[54] KEY ARRAY

[75] Inventor: Kurt Kunz, Munich, Fed. Rep. of Germany

[73] Assignee: Hans Widmaier Fabrik fur Apparate der Fernmelde-und Feinwerktechnik, Munich, Fed. Rep. of Germany

[21] Appl. No.: 242,385

[22] Filed: Mar. 10, 1981

Related U.S. Application Data

[63] Continuation-in-part of Ser. No. 917,119, Jun. 19, 1978, abandoned.

[30] Foreign Application Priority Data

Jun. 28, 1977 [DE] Fed. Rep. of Germany ....... 2729157

[51] Int. Cl.[3] ...................... H01H 13/70; H02B 15/00

[52] U.S. Cl. ............................... 200/5 A; 235/145 R; 340/365 R

[58] Field of Search .............. 200/5 R, 5 A, 6 A, 329, 200/331, 332, 340; 340/365 R, 365 S; 235/145 R; 400/100, 479, 485, 486, 487, 490, 494

[56] References Cited

U.S. PATENT DOCUMENTS

| | | | |
|---|---|---|---|
| 2,261,115 | 11/1941 | Hofgaard | 235/145 R X |
| 2,730,248 | 1/1956 | Van Waert | 400/100 X |
| 3,307,148 | 2/1967 | Fukamachi | 340/365 S |
| 3,523,184 | 8/1970 | Vogel | 235/145 R |
| 3,980,823 | 9/1976 | Howard | 178/30 |
| 4,042,777 | 8/1977 | Bequaert et al. | 340/365 R |

FOREIGN PATENT DOCUMENTS

| | | |
|---|---|---|
| 700140 | 12/1940 | Fed. Rep. of Germany . |
| 737039 | 7/1943 | Fed. Rep. of Germany . |
| 1107534 | 5/1961 | Fed. Rep. of Germany . |
| 1520626 | 4/1968 | France . |
| 2317751 | 2/1977 | France . |

OTHER PUBLICATIONS

IBM Tech. Disc. Bull.; W. F. Beausoliel et al., "Compact Keyboard", vol. 13, No. 11, Apr. 1971, pp. 3574, 3575.

IBM Tech. Disc. Bull.; E. G. Nassimbene; "Touch Actuated Keyboard", vol. 18, No. 12, May 1976, pp. 4140, 4141.

*Primary Examiner*—J. R. Scott

*Attorney, Agent, or Firm*—Brown & Martin

[57] ABSTRACT

A key array in which, progressing from key to key, the switching functions are derived by an AND-operation from mechanical or electrical signals indicating the actuation of pairs of adjacent keys of a row of keys or indicating the actuation of at least two diagonally opposite keys of a square group of four keys arranged in a rectangular keyboard. The pairs of adjacent keys and the square groups of four keys, respectively, each are allocated to a single symbol and each are depressable simultaneously by the operator's fingertip in order to initiate the single respective switching function. Thereby, a large surface lying in one single plane and being divided by gaps between the respective keys of one pair of keys or one group of keys, is available for the symbol legend and for engagement by the fingertip.

11 Claims, 8 Drawing Figures

KEY ARRAY

CROSS REFERENCE TO RELATED APPLICATION

This is a continuation-in-part of application Ser. No. 917,119 filed June 19, 1978, now abandoned.

FIELD OF THE INVENTION

This invention relates to a key array for initiating switching functions or switching signals which are associated with respective symbols or legends on the surface of the keys.

BACKGROUND OF THE INVENTION

It is generally known to provide key arrays in the form of keyboards or of rows of keys, in which each key has associated with it an actuating device such as a switch contact which is closed to perform a switching function in response to an actuation of the respective key, or delivers a switching signal to a utilizing circuit as soon as the associated key is depressed. Known key arrays of this kind can be reduced in size only within certain limits because each key must be so large that an operator's fingertip can safely engage the key without depressing an adjacent key, possibly initiating an undesired function. To avoid an undesired actuation of keys where the keys are relatively small, it is known to provide an actuating pin or stylus for depressing individual keys, for example, in midget computers. Alternatively, the individual keys may be formed like islands having a raised mushroom-shaped surface for engagement by the actuating finger so that an adjacent key cannot be depressed together with or instead of the desired key unless the desired key is highly eccentrically engaged by the actuating finger.

In numerous cases it is desired to provide keys having a large legend surface for visual clarity and to enable a convenient actuation of the keys in that the key surface which is engageable by the actuating finger is at least as large as the projection of the fingertip. With reduced size keyboards this cannot be accomplished with the known key arrays because the keys which are provided in midget key arrays and can be depressed only with an actuating stylus cannot be provided with clearly visible legends. Further, a separate element is required for their actuation. In addition, problems arise because the island type keys present also only a greatly restricted legend surface and create a visual impression which often confuses the operator. Also, if the top of the key is sufficiently small for the desired purpose, the key cannot be actuated conveniently. It is further known from U.S. Pat. No. 2,261,115 (Hofgaard) to reduce the number of keys necessary for initiating a predetermined number of switching functions or switching signal combinations. This is accomplished by providing key groups in different levels and of different shape so that the fingertip of an operator is enabled to perform an encoding operation by which selectively either the respective keys singularly or together with one or two neighboring keys can be depressed. The legends or symbols are correspondingly provided on the surfaces belonging to one single key and on surfaces common to a plurality of keys, respectively. It is a disadvantage of the Hofgaard key arrangement that, at least with regard to some of the symbols and corresponding signal combinations, the key surface available for a safe and unambiguous operation and for providing a legible legend is not large enough.

Another device having a compound key/signal arrangement is shown in U.S. Pat. No. 2,730,248 (Van Waert). In this keyboard, output signals are obtained by depressing one key, a combination of two keys, or a combination of four adjacent keys. Each key has a function whether individually or in combination with another one or three keys which are depressed simultaneously.

SUMMARY OF THE INVENTION

It is an object of this invention to provide a key array of reduced size having a surface lying in a single plane which has sufficient area available for legends or symbols to be imprinted thereon, and a sufficiently large surface area for unambiguous engagement by an operator's finger of the key surface which is associated with a given symbol.

This object is accomplished according to the invention in that, progressing from key to key, switching functions or switching signals each are derived by an AND-operation from signals indicating the actuation of pairs of adjacent keys arranged in a row or the actuation of at least two diagonally opposite keys of a square group of four keys arranged in a keyboard. In these arrangements of the pairs of adjacent keys and the square groups of four keys respectively, each are allocated to one symbol and each are depressable simultaneously by the operator's fingertip in order to initiate the respective switching function. If the keys of the array are disposed in a keyboard, it is preferable to derive the switching function or switching signal only from the signals which indicate the actuating of alternate keys in each row and alternate keys in each column, that is, a checkerboard arrangement of actuating keys.

The signals which indicate the actuation of keys of a group and are to be used in the AND-operation may result from a mechanical AND-switching element, which consists of a switching pin, which is operable to initiate the switching function or switching signals. The keys which can be actuated to produce the signals may be coupled to the switching pin for a movement toward the position of rest. The switching pin may be biased toward the actuated position by a force which is smaller than the force which biases the keys toward their position of rest so that the bias of the switching pin cannot move the latter to its actuated position unless all keys of the respective group have been actuated.

Alternatively, the signals which indicate the actuation of a key may be applied to a mechanical-electrical AND-switching element, which delivers an electric signal that is the result of a switching function or constitutes a switching signal.

Each key which can be actuated to produce an actuation-indicating signal may have switching means associated therewith, which in response to an actuation of the key deliver signals which are then used in said AND-operation. Thus, such an embodiment has an electrical AND-function, while others mentioned above have a mechanical AND-function.

In a preferred embodiment of such key array, those keys of a group which can be actuated to produce the actuation-indicating signals to be used in the AND-operation are coupled to a coupling pin for a movement in the direction of the actuating movement in such a manner that the coupling pin is not depressed unless all keys of the respective group have been depressed.

Because the keys of each group have a common legend surface, which is divided by the gaps between the keys, a sufficiently large surface is available for each symbol and errors in actuation are avoided with a high degree of safety, even in a reduced surface area keyboard.

BRIEF DESCRIPTION OF THE DRAWING

The objects, advantages and features of the invention will become readily apparent from the following detailed description when read in conjunction with the accompanying drawing, in which.

DESCRIPTION OF THE PREFERRED EMBODIMENTS

Figure 1:
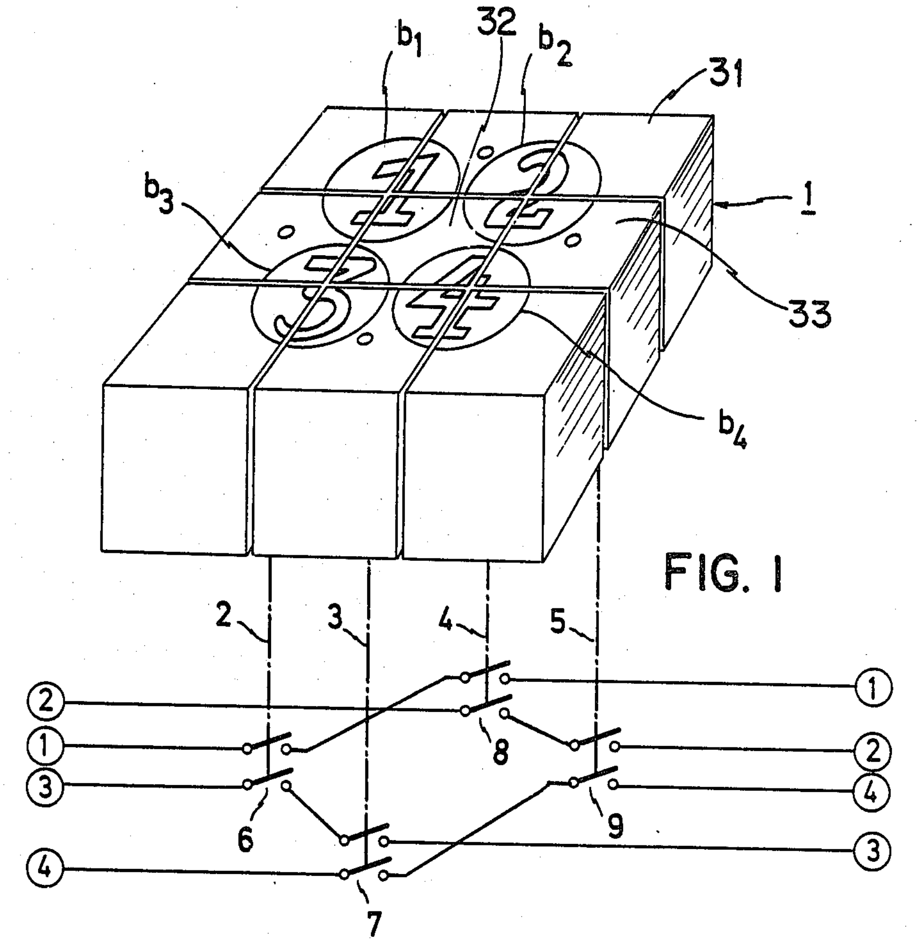
FIG. 1 is a diagrammatic, partly perspective view showing a key array consisting of a keyboard.

With reference now to the drawing, FIG. 1 shows a keyboard 1 in which keys can be depressed to signal only four symbols or to initiate switching functions or switching signals associated with the respective symbols. A known key array is shown in a top plan view in FIG. 2 and comprises four keys, each of which is associated with its own respective symbol. This is contrasted in FIG. 3 by the keyboard of FIG. 1, shown on the same scale as FIG. 2. The keyboard shown in FIG. 1 comprises nine keys, on the surfaces of which are four legend fields $b_1$, $b_2$, $b_3$, and $b_4$. Each of these legend fields comprises part of the surface of each of four keys, which are arranged at the corners of a square and constitute a group of keys. As a result, each of the legend fields $b_1$ to $b_4$ is divided by the crossing gaps between the keys of a group and may be defined as the crosspoint of the gaps between the key rows and the key columns for each group of four keys to which a symbol is allocated. The top surfaces of the keys lie in a substantially common plane. However, the top surfaces of each key need not be planar. It is apparent that in the embodiment of FIG. 1 only those keys of the entire keyboard which are disposed at the corners are associated with a single legend field and that each of the remaining keys belongs to two or four different legend fields. It is also apparent that each key is adjacent to at least three other keys (see key 31), and to as many as eight other keys (see key 32).

Several keys are individually coupled by mechanical transmitting means 2, 3, 4 and 5 to respective sets of contacts 6, 7, 8 and 9. The individual contacts of the contact sets 6–9 are connected in such a manner that the signals which are applied by the mechanical transmitting means 2–5 and indicate the actuation of the keys of the keyboard, perform an AND-operation. The mechanical transmitting means may be as simple as a rod connected between a key such as key 33 and contact 9. It could just as easily by any of several mechanisms which could transmit the depression of key 33 to contact 9 to change the status of the contact set.

In response to a depression of those keys of keyboard 1 which belong to legend field $b_1$ and serve to signal the symbol "1", mechanical transmitting means 2 and 4, which are associated with the first key of the second row ($R_2$) and with the first key of the second column ($C_2$), close the upper contact of each of the sets of contacts 6 and 8 so that the associated signal line is completed for an actuation or indication corresponding to the symbol "1". In response to the depression of those four keys of the keyboard 1 which are associated with the legend field $b_2$, the mechanical transmitting means 4 and 5, which are coupled to the first key of the second column and the last key of the second row, close the lower contact of the set of contacts 8 and the upper contact of the set of contacts 9 so that the signal line connected thereto is completed for an actuation or indication corresponding to the symbol 2.

When those keys are depressed which are associated with the legend field $b_3$, the mechanical transmitting means 2 and 3 respond to the depression of the first key of the second row and of the last key of the second column by closing the lower contact of the set of contacts 6 and the upper contact of the set of contacts 7 so that the signal line 3 is completed. Finally, the lower contacts of the sets of contacts 7 and 9 are closed in response to an actuation of the keys which are associated with the legend field $b_4$ so that the signal line 4 is completed. To facilitate the understanding of the drawing, those keys to which the mechanical transmitting means 2–5 are connected are indicated by a dot on the surface of the key. It will be observed that the keys with the dots are diagonally adjacent.

The depression of any key coupled to one of the mechanical transmitting means 2–5 may be said to produce a "key signal." The results of the AND function of the sets of contacts 6–9 may be said to produce an "output signal."

Figure 3:
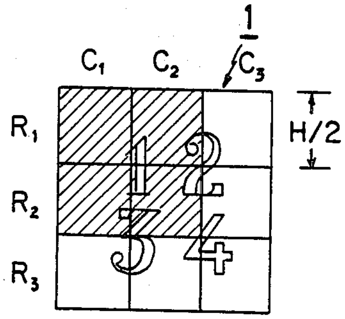
FIGS. 2–5 are top plan views showing key arrays of the kind suggested herein and of a previously known kind for a comparison of size.
Figure 2:
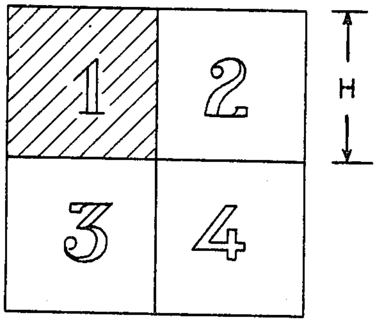

A comparison of FIGS. 2 and 3 reveals that the surface area presented to the fingertip of an operator's hand by the keys associated with a legend field, for example, the legend field $b_1$, which is shown shaded in FIG. 3, is the same as the surface area of an individual key of a keyboard of known type such as that shown in FIG. 2. This results from the consistent selected coding of the actuation-indicating signals inasmuch as the same lateral range is available for the movement of an actuating finger without risk of an error in operation. As a result of the AND-operation using the signals which indicate the actuation of the selected keys of a group, certain portions of the key surface, which key is associated in part also with an adjacent signal, can be utilized as an effective surface for actuation for a given symbol. Even in a small keyboard for only four symbols, this permits the surface area required for the entire key array to be decreased by a factor of 9/16 without ambiguity or a loss in reliability of operation. That factor will be much larger where larger numbers of symbols are concerned.

Figure 4:
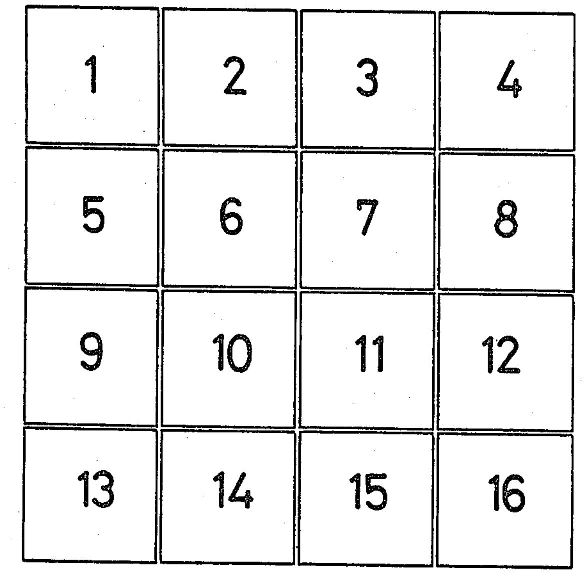
Figure 5:
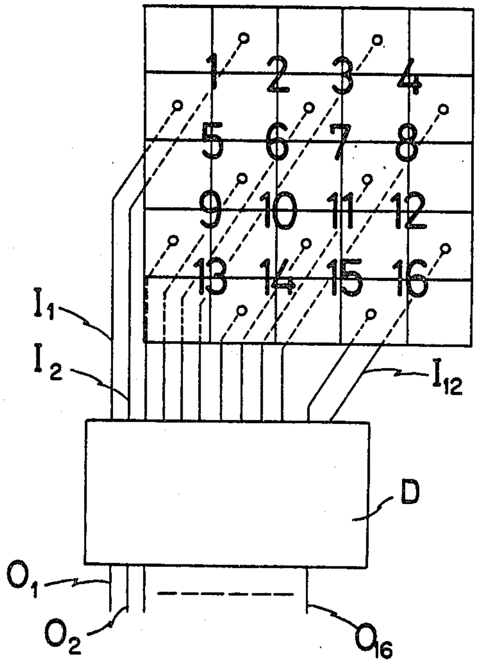

This is apparent from FIGS. 4 and 5. FIG. 4 shows a keyboard having sixteen keys in a square array of four rows and four columns. That keyboard comprises switching elements which are associated with respective symbols 1 to 16 so that sixteen switching elements are required to produce signals corresponding each symbol.

In the keyboard of the kind proposed here, which is shown in FIG. 5, only twelve switching elements are associated with specific keys in such a manner that only alternate keys of each row and alternate keys of each column are used to operate each such switching element. In comparing the keyboard of FIG. 5 with the keyboard of FIG. 4, it can be seen that the invention requires more keys (25 compared with 16) for a given number of functions, but requires fewer switching elements (12 compared with 16) for the same number of functions. The output signals of these switching elements are applied to a decoder D, which has twelve inputs $I_1$–$I_{12}$ and sixteen outputs $O_1$–$O_{16}$. The decoder may consist of an integrated circuit and is within the state of the art, needing no further description here. Just as in FIG. 1, a dot is used in FIG. 5 to indicate those keys which serve to operate a switching element from which an output signal line leads to a specific input of the decoder D. In the diagrammatic representation of FIG. 5, that portion of each signal line which extends under the keyboard is represented by a dotted line. A comparison of FIGS. 4 and 5 reveals that less surface area is required whereas the reliability of operation is not affected for the same number of functions. The additional expenditure, if any, which might be due to the decoder will be negligible particularly if an electronic decoder is used.

The size relationships between keyboards with single function keys, and keyboards of the present invention can be appreciated when the sizes and relationships are represented mathematically. Assuming the keys of both keyboards in FIGS. 2 and 3 are square, the length of one side of a single function key in FIG. 2 is represented by the letter H, where the standard target actuating area is assumed to be a square having side lengths of H. In FIG. 3 each key has a size of H/2. The columns of keys in FIG. 3 are designated $C_1$, $C_2$ and $C_3$, while the rows are $R_1$, $R_2$ and $R_3$.

For any rectangular keyboard constructed in accordance with the invention (FIGS. 3 and 5), there are $S_R$ rows of symbols and $S_c$ columns of symbols. As has been previously stated, for a given number of functions F expressed as:

$$F=(S_R)(S_c):$$

There are more keys K, expressed as:

$$K=(S_R+1)(S_c+1).$$

If each key has a side length of H/2, the dimensions of a keyboard of FIGS. 3 and 5 are as follows:

$$\text{Width}(W)=(S_c+1)H/2$$

$$\text{Height}(L)=(S_R+1)H/2$$

$$\text{Surface Area}(A)=(W)(L)$$

It has been stated previously that the actuating target area for each symbol or function is the same for the respective keyboards in FIGS. 2 and 3 as well as in FIGS. 4 and 5. Thus in accordance with the invention, it can be seen that the overall size is less than for a keyboard of single function keys. For 16 functions arranged in a four-by-four array, where H is one centimeter, the dimensions are as follows for the FIG. 5 keyboard:

$$W=(4+1)\tfrac{1}{2}=2.5\text{ cm}$$

$$L=(4+1)\tfrac{1}{2}=2.5\text{ cm}$$

$$A=(2.5)(2.5)=6.25\text{ cm}^2$$

The number of keys are:

$$K=(4+1)(4+1)=25$$

For comparison, the dimensions for the FIG. 4 keyboard are:

$$W=(4)(1)=4\text{ cm}$$

$$L=(4)(1)=4\text{ cm}$$

$$A=(4)(4)=16\text{ cm}^2$$

The number of keys are:

$$K=(4)(4)=16$$

Thus it will be appreciated that without sacrificing accuracy the present invention permits the keyboard size to be reduced markedly, approaching a factor of four in area, as the total number of functions increases. Even though there are more keys, it is also significant to note that fewer switching elements are necessary. By using the AND arrangement described herein, the number of key signals or switching functions (SF) necessary for a given number of operating functions F where F is even:

$$SF=\frac{(S_R+1)(S_c+1)-1}{2}$$

Where F is 16, the number of switching functions is:

$$SF=\frac{(4+1)(4+1)-1}{2}=\frac{24}{2}=12$$

Where the number of operating functions F is odd, the number of switching functions is:

$$SF=\frac{(S_R+1)(S_c+1)}{2}$$

Where F is 25, the number of switching functions is:

$$SF=\frac{(5+1)(5+1)}{2}=\frac{36}{2}=18$$

Of course, for the standard keyboard of single function keys (FIGS. 2 and 4), the number of switching functions equals the number of functions F. Thus, for FIG. 4, there are 16 switching functions, instead of 12 for the equivalent keyboard of this invention (FIG. 5).

In the key array shown in FIG. 1 the AND-operation, using the signals which indicate the actuation of the keys which are associated with a legend field, is performed by an electrical or electro-mechanical AND-gate consisting of series-connected switch contacts. In the key array of FIG. 6, the AND-operation is performed by a mechanical AND-switching element consisting of a switching pin, which cooperates with the keys which are associated with a legend field and form a square array around the respective switching pin. Each switching pin 10 has a head 11, which is received by a recess at the center of the group of keys. The switching pin has also a stem 19 which extends through a bore, which is formed in a group of keys at their commonly adjacent point. A tension spring 12 is connected to the lower end of the switching pin 10 and tends to pull the switching pin down against the force of compression springs 13, which bias the individual keys upwardly to a position of rest. The tensile force exerted by the spring 12 is smaller than the tensile force of each compression spring 13. As a result, the switching pin 10 cannot be pulled down to its actuated position unless all keys which belong to a group, or are associated with a legend field, are depressed. It will be understood that the head 11 of the key-operable pin 10 may alternatively be accommodated inside the keys in a recess or chamber provided therein so that the legend fields are closed surfaces except for the small gaps between the individual keys. In such an embodiment, the finger of the operator would not make contact with the switching pin at all, but would merely depress the appropriate keys at the mutual intersection. An example of such structure is shown in FIG. 7 where the depression of the keys at symbol 6 depresses compression springs 13 of the adjacent keys, thereby allowing tension spring 18 to pull the switching pin down to the actuated position.

Figure 6:
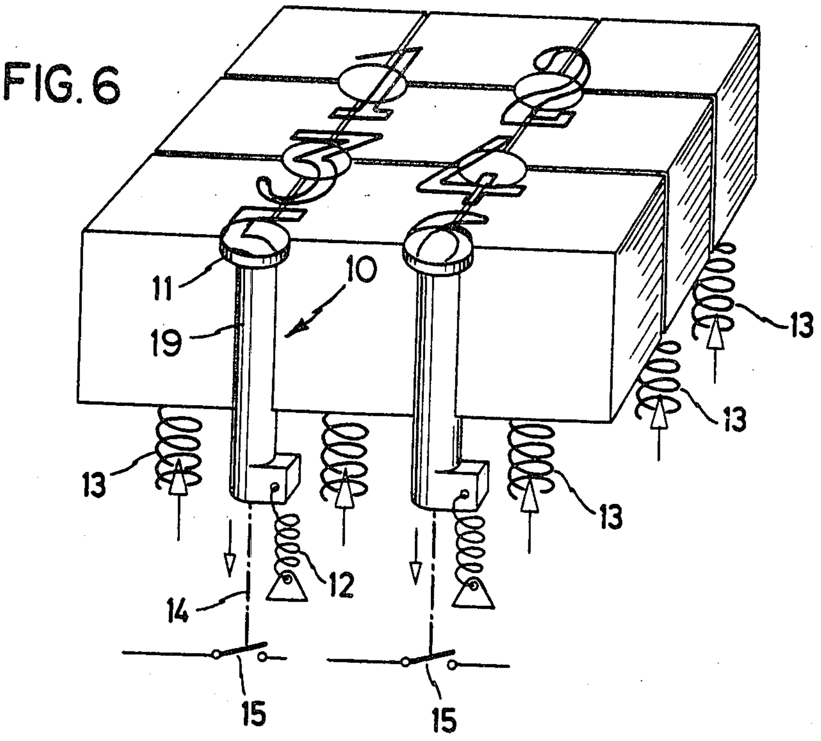
FIG. 6 is a diagrammatic, partly perspective elevation showing another embodiment of a key array.

Key-operable switches 15 are connected to respective switching pins 10 by mechanical transmitting means or operating linkages 14 much like the similarly employed means 2–5 in FIG. 1. Linkages 14 and switches 15 serve to perform the switching functions or produce the switching signals which are defined by the symbols as previously explained with respect to FIG. 1. As described, the AND function of FIG. 6 is mechanical, the electrical output signal of switch 15 resulting only when the AND function has occurred. The embodiment shown in FIG. 7 is similar to that of FIG. 1. The switch contacts which complete the signal lines 1 to 4 are represented by a block 16. The sets of contacts are operatively connected by the mechanical transmitting means 2 to 5 to those keys of the keyboard 1, which are marked with a dot on their surface in order to facilitate the understanding of the figure. It is pointed out that the columns of keys are longer in the keyboard of FIG. 7 than in FIG. 1 and that FIG. 7 is a fragmentary view. This suggests that the concepts pointed out here are applicable to keyboards of any desired size.

Figure 7:
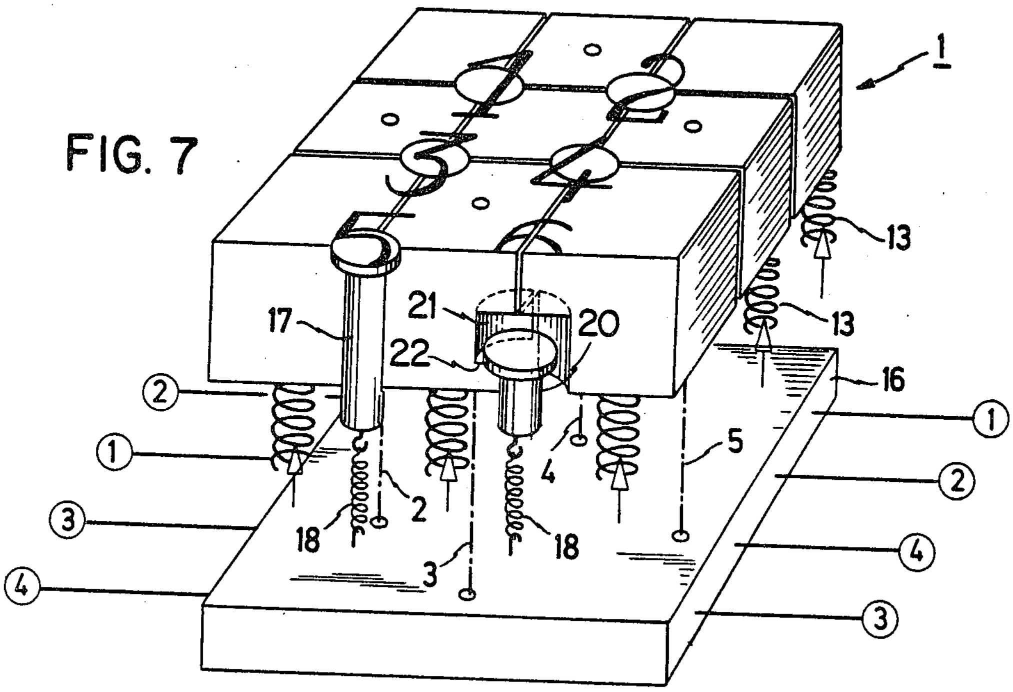
FIG. 7 is a diagrammatic perspective view showing a still further embodiment of a key array of the kind proposed herein.

In the embodiment shown in FIG. 7, coupling pins 17 are provided between the keys which are associated with a legend field. These coupling pins are similar to the switching pins 10 of the embodiment of FIG. 6. Coupling pins 17 are biased downwardly by small tension springs 18. The compression springs 13 bias the individual keys of the keyboard 1 toward their position of rest. When the keys associated with a legend field are engaged by the tip of an actuating finger in such a manner that the head of the coupling pin 17 is depressed, or allowed to move downwardly under the influence of spring 18, at the same time all keys of a group will be actuated in synchronism so that the sets of contacts are properly operated by the mechanical transmitting means 2–5. It is apparent that the coupling pins 17 serve as synchronizing means. Compared to known key arrays having island-like keys, the embodiments shown in FIGS. 6 and 7 afford the advantage that a considerable legend field is available for each symbol and a closed surface is presented to the actuating finger for engagement.

To a person skilled in the art it is apparent from the above description that where the heads of the switching pins 10 or coupling pins 17 are exposed on the surface of the keys, maximum reliability of operation will be obtained if the size of such heads is minimized. From this aspect the embodiment of FIG. 1 is preferred. The alternative embodiment mentioned above is shown with respect to the location of legend field 6 in FIG. 7. Shorter coupling pin 20 is shown with its head partially enclosed within chamber 21 formed in the adjacent surrounding keys. It can easily be seen that given the spring arrangement previously described, depression of a single key associated with legend field 6 would not permit pin 20 to be actuated. All of the keys surrounding the head of pin 20, which have a support surface or shoulder 22 thereunder, must be depressed simultaneously for pin 20 to be actuated, that is, to move downwardly under the influence of tension spring 18. This mechanical AND operation may advantageously be coupled with the electrical actuation embodiment shown in FIG. 6, where a switch such as 15 is actuated directly by movement of pin 20 through means such as linkage 14.

Figure 8:
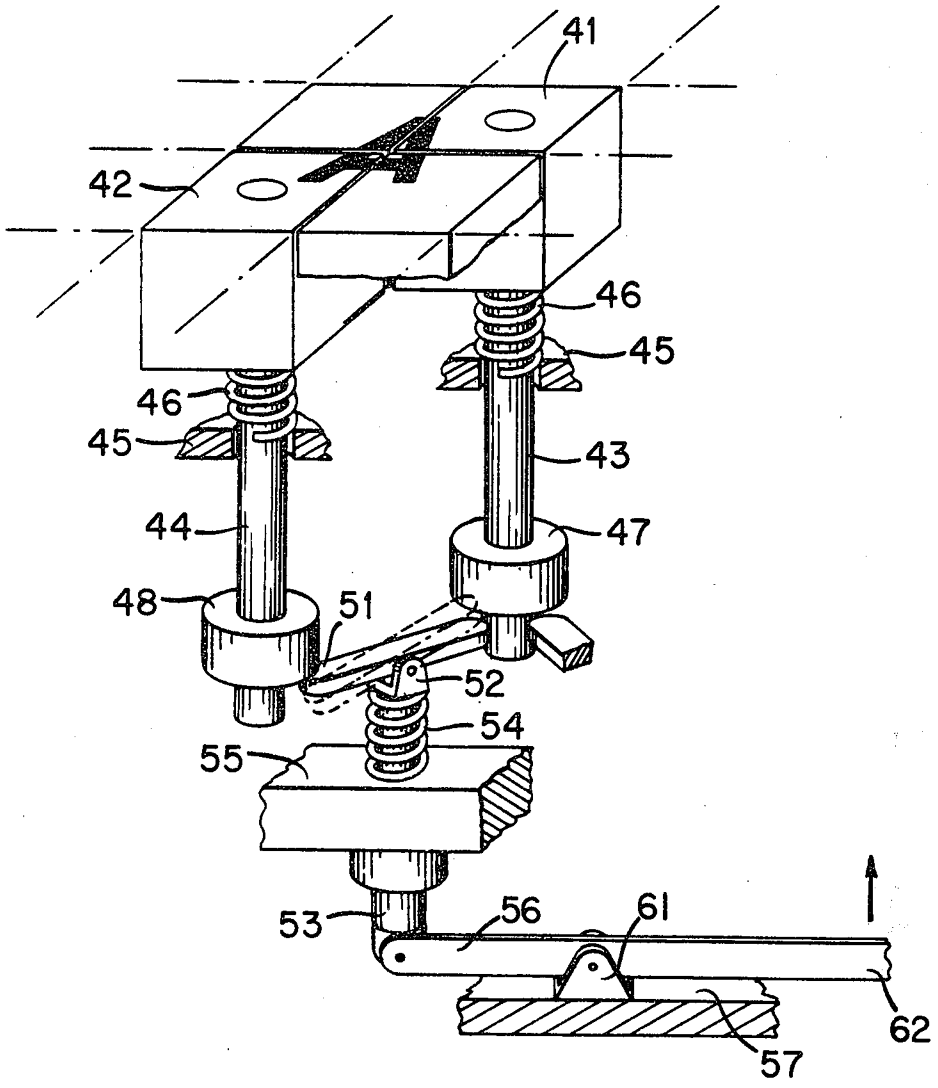
FIG. 8 is a diagramatic perspective view of an exemplary structure capable of producing an AND function by mechanical means.

Another mechanical AND function is shown in FIG. 8 where the symbol A is used in the legend field. Each key 41, 42 has a stem 43, 44 respectively, passing through board 45. The keys are biased upwardly to their position of rest by means of compression springs 46. The stems have a respective collar 47, 48 thereon which are adapted to engage lever 51. The lever is pivoted by means of yoke 52 to pin 53 which is biased upwardly by means of compression spring 54 in conjunction with board 55 through which pin 53 passes. The lower end of pin 53 is connected to lever 56 which is pivotably mounted to frame member 57 by means of yoke 61. The opposite end 62 of lever 56 may be used to actuate an electrical switch contact as desired.

It may be perceived that there are a number of ways to devise the mechanical, electrical, or electro-mechanical AND functions, without affecting the principles of the invention. To reiterate, it is necessary that a symbol be on a legend field at the common adjacent portion of four mutually adjacent keys, and that there be an AND function of some type associated with two of those keys which are simultaneously depressed in order to provide an output corresponding to the symbol at the depressed intersection. This permits a standard actuating target area with greatly reduced keyboard surface area and a reduced number of switching functions, even while the actual number of keys is increased. Another advantage is that the "feel," or counterpressure, to the operator is consistent with each key actuation because it is always the same number of keys which are depressed to obtain an output. Construction of the keyboard is relatively straightforward because the checkerboard pattern of operative keys is consistent, as is the coding involved in the necessary AND functions. There are never any more or any less than four keys involved in a symbol actuation so there is no chance of operator confusion, either visually, or caused by changes in counterpressure or "feel."

It is likely that modifications and improvements will occur to those skilled in the art which are within the scope of this invention.

What is claimed is:

1. A keyboard for initiating switching functions, said keyboard comprising:

electrical signal output means;

a plurality of mechanically operated depressable keys arranged in a rectangular array of rows and columns, the exposed top surfaces of said keys lying in a substantially common plane and having visual symbols thereon, each said symbol being allocated only to a group of four keys in a square arrangement of mutually adjacent keys and appearing at the area of mutual adjacency in such manner that each crosspoint of the gaps between keys in the key rows and keys in the key columns is allocated to one symbol and each symbol is allocated to one crosspoint;

individual means for producing a key signal coupled to alternating ones of said keys in each row and in each column in a checkerboard fashion, said key signal resulting from downward motion of each said key, each said group of four keys including two diagonally adjacent keys coupled to respective key signal producing means, at least some of the keys in each group being part of another adjacent group of four keys; and means coupled between said electrical signal output means and said two key signal producing means in each said group for combining said key signals in an AND function to provide an output signal from said electrical signal output means corresponding to said symbol at the crosspoint of gaps of said four keys in a group, said output signal occurring only when the mutually adjacent keys at a crosspoint are depressed, including said two key signal producing means;

whereby depression of less than all of the keys at a crosspoint will not produce an output signal and misoperation of the keys to produce an output signal is highly unlikely.

2. The keyboard recited in claim 1 wherein said AND function combining means are mechanical whereby a single mechanical motion is coupled to said electrical signal output means upon depression of the crosspoint of gaps of one of said groups of keys.

3. The keyboard recited in claim 1 wherein said AND function combining means are electromechanical, each providing an electrical output signal corresponding to the symbol on the crosspoint of gaps of one of said groups of keys when actuated by two of said key signal producing means.

4. The keyboard recited in claim 1 and further comprising biasing means acting against forces employed to depress said keys, said biasing means being identical for each of said keys, whereby the force necessary to depress said four adjacent keys at a crosspoint of gaps is invariable for each of the symbols on said keyboard.

5. The keyboard recited in claim 1 wherein each said crosspoint of gaps on said keyboard has a symbol imprinted thereon, said keyboard having a plurality of symbols in mutually adjacent relationship on the surface of said keyboard.

6. The keyboard recited in claim 1 wherein for a given number of functions F produced by said keyboard arranged in $S_R$ rows, and $S_c$ columns of symbols, the number of keys K is given by:

$$K=(S_R+1)(S_c+1)$$

7. The keyboard recited in claim 1 or 6 wherein for a given number of functions F and wherein the size of the keyboard symbol target actuating area is a square having a side length of H, the size of each said key is H/2.

8. The keyboard recited in claim 7 wherein the width W and length L of said keyboard are:

$$W=(S_c+1)(H/2)$$

$$L=(S_R+1)(H/2)$$

and the surface area A is:

$$A=(W)(L)$$

9. The keyboard recited in claim 1 or 6 wherein for a given even number of functions F, the number of key signal producing means SF is:

$$SF_{(even)}=\frac{(S_R+1)(S_c+1)-1}{2}$$

10. The keyboard recited in claim 1 or 6 wherein for a given odd number of functions F, the number of key signal producing means SF is:

$$SF_{(odd)}=\frac{(S_R+1)(S_c+1)}{2}$$

11. A keyboard for initiating switching functions, said keyboard comprising:

a plurality of keys arranged in a rectangular array, each key being adjacent, side-by-side and diagonally, to at least three and no more than eight other keys, said array comprising a plurality of groups of four mutually adjacent keys, there being a single visual symbol associated with each said group of keys and positioned at the crosspoint of each group of four keys, each said symbol being allocated to one of said crosspoints, at least some of the keys in each group being part of another adjacent group of four keys;

means for producing a key signal resulting from the downward motion of said keys, said means being coupled to diagonally adjacent keys in said array in a checkerboard pattern, whereby only two diagonally adjacent keys in each said group of four mutually adjacent keys have one of said key signal producing means coupled thereto; and means for combining two of said key signals in an AND function to generate an output switching function only when the adjacent keys including those with said signal producing means coupled thereto are depressed simultaneously at a crosspoint.

* * * * *